United States Patent

[11] 3,554,133

| [72] | Inventors | Milo De Angelis<br>5080 Glen Carin St., North Burnaby;<br>Charles P. Koch, 301-2235 W. 3rd,<br>Vancouver, British Columbia, Canada |
|---|---|---|
| [21] | Appl. No. | 777,574 |
| [22] | Filed | Nov. 21, 1968 |
| [45] | Patented | Jan. 12, 1971 |

[54] AUTOMOBILE CONVEYOR
8 Claims, 6 Drawing Figs.

[52] U.S. Cl. .................................................. 104/172, 198/168
[51] Int. Cl. .................................................. F04b 1/00, B65g 19/00
[50] Field of Search ......................................... 198/168, 172, 173; 104/172

[56] References Cited
UNITED STATES PATENTS

| 3,260,219 | 7/1966 | Vani ............................ | 104/172 |

FOREIGN PATENTS

| 1,915,081 | 4/1965 | Germany ...................... | 198/168 |

Primary Examiner—Richard E. Aegerter
Attorney—Lyle G. Trorey

ABSTRACT: An automobile conveyor having an endless conveyor chain to which automobile engaging assemblies are connected in spaced apart intervals, extending longitudinally of and normally beneath a longitudinally extending slot formed in an automobile supporting platform and a manually operated elevator for selectively lifting any assembly to a projecting position through the slot and onto a track which supports the lifted assembly in said projecting position so as to permit the latter to engage and move an automobile across the platform.

Milo De Angelis and
Charles P. Koch,
Inventors, by Lyle G. Trorey,
Agent

Milo De Angelis and
Charles P. Koch,
Inventors by  Lyle G. Trorey, Agent

PATENTED JAN 12 1971
SHEET 3 OF 3
3,554,133
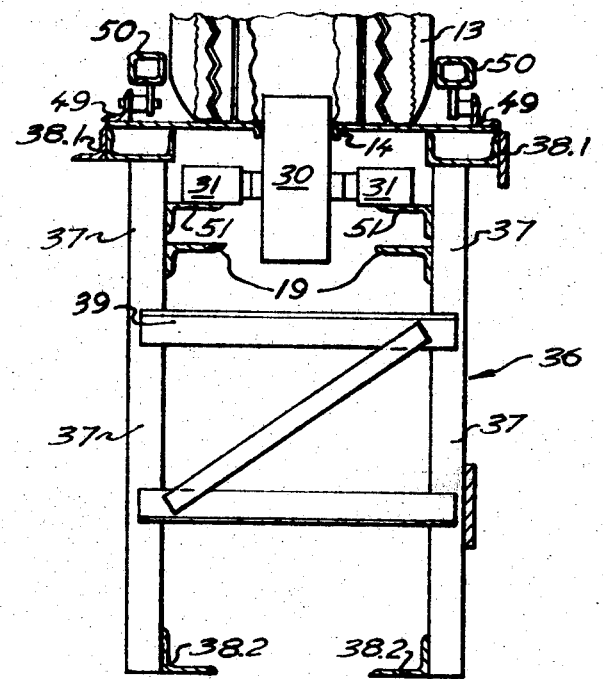
Fig. 5
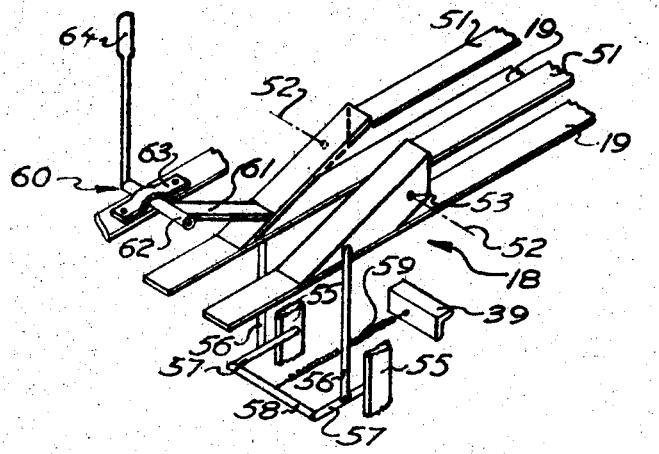
Fig. 6
Milo De Angelis and
Charles P. Koch,
Inventors
by 
Lyle G. Trorey,
Agent

AUTOMOBILE CONVEYOR

BACKGROUND OF THE INVENTION

This invention relates to conveyors and in particular conveyors for moving automobiles through work areas. The invention more specifically relates to car wash conveyors wherein automobiles are continuously moved during the washing and cleaning thereof.

In the design and fabrication of automobile conveyors for car wash plants it is generally the practice to employ an endless travelling chain belt to which is connected engaging assemblies for engaging automobiles positioned thereover and for drawing them through the washing and cleaning area of the plant. In some instances the conveyor chain has been positioned centrally of the floor over which the automobiles are moved. The automobile engaging assemblies are simply hooked to a portion of an automobile such as its bumper.

In other arrangements, however, the chain has been positioned below a slot or opening running lengthwise of the floor said slot being positioned so that it is in alignment with the tires on one side of an automobile, the slot being only of sufficient width so that it is bridged by the automobile tire. The engaging assemblies connected to the chain, in some cases, are arranged so that they continuously ride on the floor so as to engage the tire of any automobile thereover and move the automobile through the working area. This type of chain which is in continuous operation is relatively efficient, however, as the automobile engaging assemblies thereon must be spaced some considerable distance apart to afford sufficient space between an automobile already moving on the conveyor and an automobile to be moved onto the conveyor in order for the automobile engaging assemblies to engage the rear tires of said automobiles.

It is apparent that the front of steering tie tires of an automobile equipped with power steering should not be engaged as this will tend to throw the automobile off course. As automobiles are constructed in varied lengths, the intervals between engaging assemblies thereon must be sufficient to accommodate the largest automobile consequently wherein some instances a number of small cars follow each other in succession of the chain the automobile density is relatively low. This means that the plant does not operate at peak efficiency at all times.

In order to increase efficiency by obtaining high density of automobiles on a conveyor chain, certain types of conveyor chains have developed wherein the automobile engaging assemblies thereon may, on demand, be swung upwardly from a normally hidden position beneath the floor to an elevated position above the level of the floor so as to engage the tire of an automobile when an automobile has been properly positioned. In this type of chain the automobile engaging assemblies may be in closely spaced relationship rather than being distantly spaced apart as in the previously described type of conveyor so as to obtain relatively high automobile density on the chain.

Although the latter type of conveyor permits greater plant efficiency than the type of conveyor in which the automobile engaging assemblies are normally exposed throughout their passage through the work area they do have certain disadvantages. In the first place, relatively large openings must be formed in the floor at opposite ends of of the slot therein in order for the assemblies to be lifted and lowered. These openings, it will be appreciated, are relatively dangerous as a workman may inadvertently step into one of them and suffer some injury. Conveyors of this type are also relatively expensive to fabricate and are relatively noisy in operation as the automobile engaging assemblies must be loosely connected to the chain in order to prevent jamming and twisting as they travel over the floor.

SUMMARY OF THE INVENTION

The present invention provides a conveyor of the last mentioned type but which unlike the conveyors of this type are relatively inexpensive to install and maintain and are relatively noiseless. The conveyor of the present invention also does not require large openings at opposite ends of the slot and thereby eliminates a danger point in the work area.

The conveyor of the present invention is also provided with automobile engaging assemblies which do not require lifting on top of the floor but simply project through the slot on the floor so as to engage the tire of an automobile to be transported. Furthermore, the automobile engaging assemblies of the conveyor chain of the present invention are so shaped that they will automatically eject a workman's foot from the slot in which they ride should he inadvertently place his foot in their path.

The conveyor of the present invention includes an endless chain having a horizontally extending upper run extending longitudinally of a work area, an automobile supporting platform arranged over the upper run of the chain said platform having an elongated opening extending longitudinally of and above the chain, automobile engaging assemblies arranged in longitudinally spaced apart intervals on the chain, said assemblies being vertically moveable between normal hidden position below the platform and elevated position in which they project through the opening so as to engage and move an automobile positioned on said platform, an elevator arranged adjacent the upper run of the chain operable to selectively lift any engaging assembly to said elevated position, said track means having a lead end and a tail end engageable by each assembly lifted for supporting said assembly in said elevated position as the latter passes through the work area.

BRIEF DESCRIPTION OF THE DRAWINGS

FIG. 5 is a view on line 5–5 of FIG. 3.
Fig. 6 is an isometric fragmented view of the elevator.

DESCRIPTION OF PREFERRED EMBODIMENT

Figure 1:
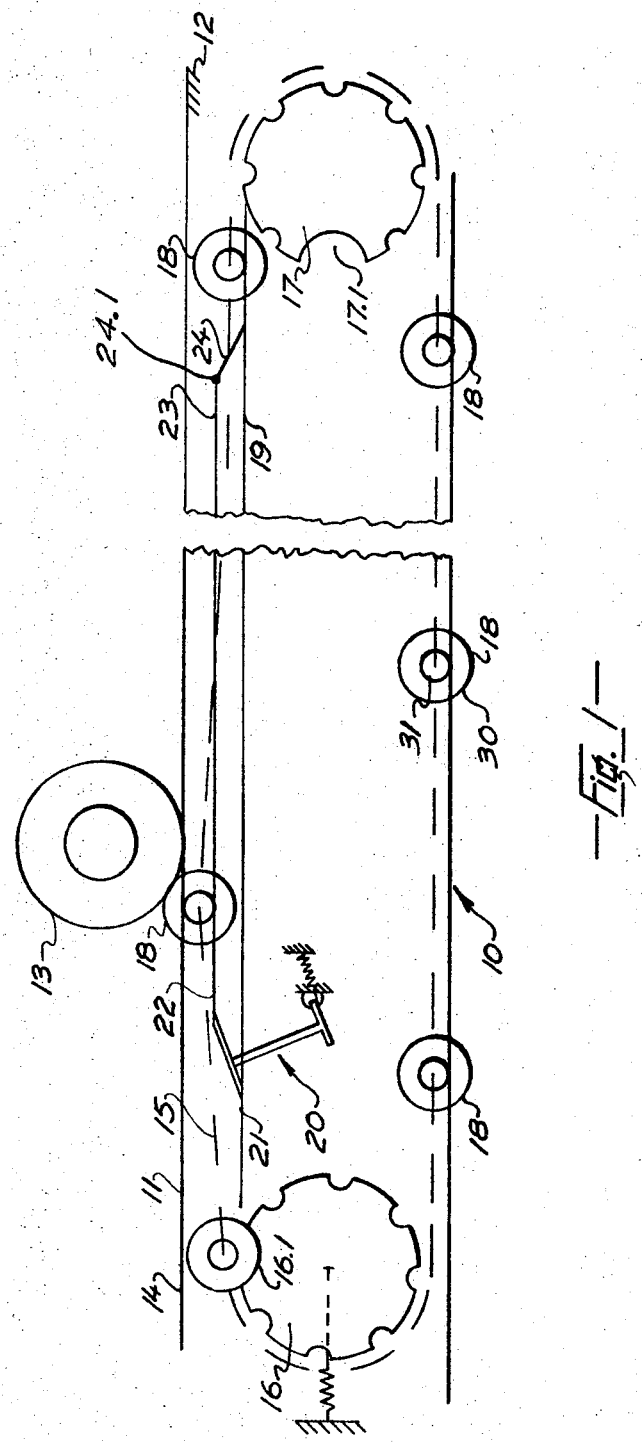
FIg. 1 is a schematic side view of the invention.

Referring to the drawings, and in particular to FIG. 1 thereof, the numeral 10 generally designates the conveyor of the invention which includes a platform 11 which extends throughout the length of the normal work area in a car wash plant. This platform is at the same elevation as the floor of plant accorded the numeral 12 and is only wide enough to accommodate the tires on one side of an automobile one of said tires and wheels being illustrated and being accorded the numeral 13. The platform 11 is provided with a longitudinal slot or opening 14 extending from end-to-end thereof.

The conveyor 10 also includes an endless chain 15 which passes over fore-and-aft sprockets 16 and 17 respectively, said sprockets being mounted for rotation about horizontal transverse axes. The sprocket 16 is a free running sprocket whereas the sprocket 17 is driven from a suitable power source not shown. The chain 15 is provided with a plurality of automobile engaging assemblies 18 spaced apart at equal intervals along its entire length. The chain and sprockets are located a sufficient distance below the platform 11 so that as the chain passes off the sprocket 16 the assemblies 18 will be in a normally hidden position pass beneath the platform throughout the whole length of the work area. A lower track assembly 19 which extends between the head and the tail sprockets is provided for supporting the assemblies and the chain in this position.

An elevator assembly 20 is positioned at head end 21 of said lower track assembly 19 said head end being the end of the track assembly adjacent to the sprocket 16. This elevator assembly is operable to permit any assembly to pass along the lower track assembly or to selectively elevate an assembly onto an upper supporting track assembly 22, the latter being located between the platform and the lower track assembly. This upper track assembly is vertically located relative to the platform such that any assembly 18 being supported thereby is projected through the slotted platform so as to engage the tire 13 of an automobile supported on the latter so as to move the automobile over the platform and through the work area of the plant. When each assembly supported by the upper track assembly 22 reaches the tail end 23 of the upper track assembly, said tail end being adjacent to the aft sprocket 17, it will roll down a sloped after ramp 24 onto the lower track assembly 19 and pass over aft sprocket 17. Said after ramp 24 is swingably mounted so that any automobile engaging assembly 18 supported by the lower track assembly 19 will be swing said ramp 24 upwards as it passes thereby.

Figure 2:
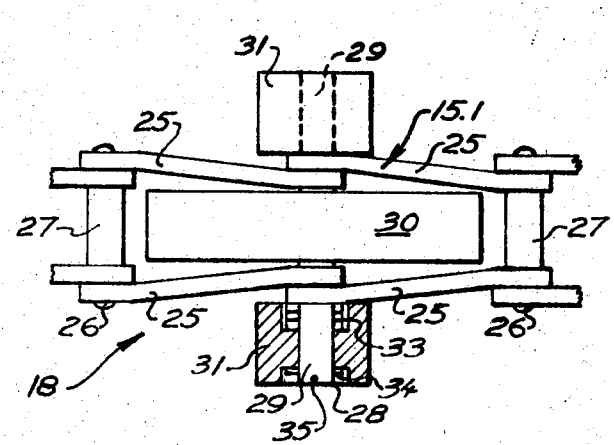
FIG. 2 is a plan view, partially in section, of an automobile engaging assembly.

One of the automobile engaging assemblies 18 and a portion of chain 15 are shown in FIG. 2. The chain 15 is of the conventional type having links 15.1 formed of elongated side bars 25–25 interconnected, in a known manner, by pintles 26 and spaced apart by tubular spacers 27 over said pintles. The automobile engaging assemblies 18, one of which is illustrated in FIG. 2, are positioned at equal intervals on a chain, preferably at every fifth or sixth link. As illustrated in FIG. 2, each assembly 18 includes an elongated axle 28 which replaces pintles 26 said axle having extending portions 29–29 which project outwardly beyond the side bars 25.

Centrally of the axle 28 and between adjacent side bars 25 is mounted a large diameter roller 30. In practice the roller is roughly 2 inches in thickness and 8 to 10 inches in diameter. On the extending portions 29–29 of the axle 28 are rotatably mounted small diameter rolls or followers 31–31 which, can be made of a material such as nylon or the like. Washers 33 positioned over the extending portions 29–29 between the rolls 31–31 and the side bars 25–25 adjacent thereto. Each of the rolls 31–31 is maintained in position on the axle 28 by means of the washer 34 and cotter pin 35 the latter extending through a suitable located transversely extending hole formed through the axle. The rolls 31–31 are both roughly 2 and to 3 inches in diameter.

As illustrated in FIG. 1 both sprockets are formed as to have semicircular indentations 16.1 and 17.1 to provide clearance for the rollers 30.

Figure 3:
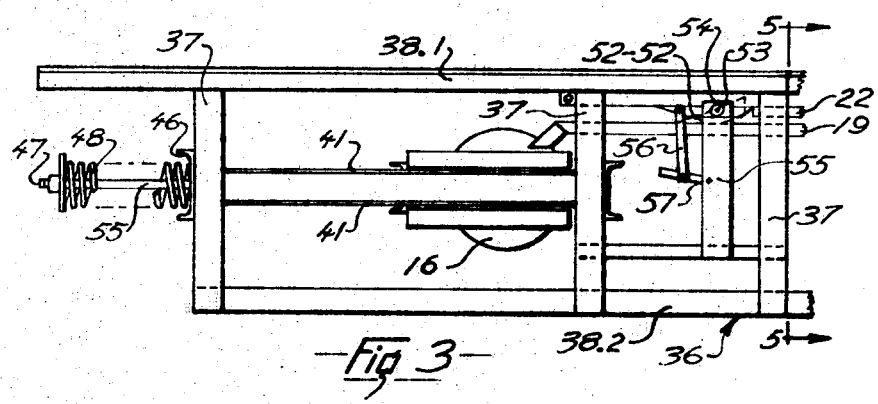
FIG. 3 is a side view of a portion of the invention.
Figure 4:
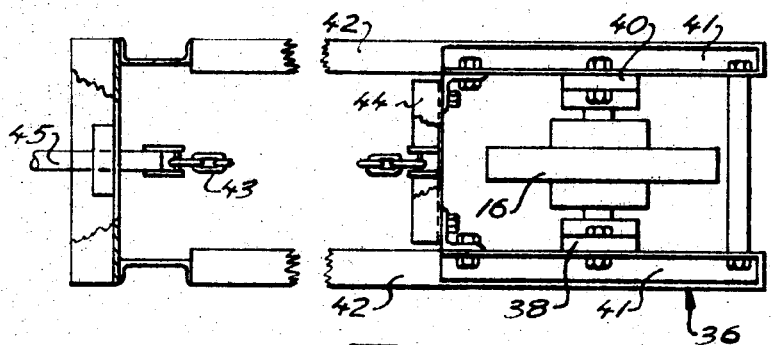
FIG. 4 is a plan view of the invention showing, partially, the portion illustrated in FIG. 2.

The conveyor includes a supporting framework 36 as illustrated in FIGS. 3, 4 and 5, this supporting framework includes vertical members 37 and upper and lower longitudinally extending members 38.1 and 38.2 respectively. The vertical members are arranged in transversely spaced apart pairs, each pair being connected by transverse structural members 39. The upper horizontal members 38.1 and the lower members 38.2 extend longitudinally beyond both sprockets 16 and 17.

As illustrated in FIGS. 3 and 4 fore sprocket 16 is mounted between two pairs of longitudinally spaced apart vertical members 37, said head sprocket being rotatably mounted in bearing blocks 38 and 40 which are secured to a pair of vertically spaced apart and longitudinally extending angle members 41–41. Each pair of said angle members 41–41 slidably embrace a pair of longitudinally extending guide members 42 the latter preferably being channel type members. This construction permits longitudinal movement of the head sprocket.

A the tether chain 43 connects a transverse head member 44 extending between both pairs of angle member 41–41 and longitudinally extending rod 45. The rod extends through a head block 46 and is threaded to receive a nut 47 which is adapted to be tightened down against a compression spring 48 which extends under compression between said head block and said nut. This arrangement permits adjustment of tension of the conveyor chain 15 which extends between the sprockets.

Aft sprocket 17 is rotatably mounted and driven in a known manner, not shown, longitudinally fixed relationship relative to the supporting framework 36.

The platform 11 includes a pair of flat plates 49–49 which are secured in spaced apart relationship on upper ends of the vertical members 36, preferably by welding. Said plates have inner or adjacent edges spaced apart so as to provide the slot 14. The slot 14 is a little wider than the width of the rollers 30 of the automobile engaging assemblies 18. Guide rails 50, as illustrated in FIG. 5 are mounted on the plates at the outer edge of the latter said rails being spaced apart a distance sufficient to accommodate a tire of an automobile so as to maintain the tire substantially centrally located over the slot 14 as the automobile moves over the platform.

The upper track assembly 22 is formed of a pair of angle members 51–**welded or otherwise secured to the vertical members 36. These angle members are spaced apart sufficiently to provide clearance for the roller 30 and the chain 15 and are rollably engaged by rolls 31–31 of the automobile engaging assemblies. As illustrated in FIG. 5 the upper track assembly is spaced only sufficient distance below the platform so that with the rolls 31–31 of each assembly 18 supported thereon the roller 30 projects upwards through the slot 14.

The lower track assembly 19 is the same as the upper track assembly and is spaced in sufficient distance below the platform so that with the rolls 31–31 supported thereon the rollers 30 of the automobile engaging assemblies are hidden below the platform.

As illustrated in FIG. 3 the lower track assembly 19 is located so that the upper run of the chain 15 passing from fore sprocket 16 would normally tend to follow the lower track assembly.

The elevator assembly 18, as illustrated in FIGS. 3 and 6, includes a pair of ramps 52–52 located at the head end of the upper track assembly 22 these ramps which may be formed of lengths of angle iron are mounted for pivotal movement intermediate their ends on transversely extending pins or bolts 53 which extend through upper ends 54 of vertical braces 55 secured to the supporting framework. These ramps, as illustrated in FIG. 3, are swingable about the pins or bolts 53, from an inclined position extending upwardly from the lower track assembly and a horizontal position in which their upper surfaces are aligned with the upper track assembly. Links 56 connect the ramp with levers 57–57 which are each pivotally connected at an end to vertical braces 55–55. These levers, as illustrated in FIG. 6 are interconnected by a transverse connecting bar 58. A tension spring 59 extends between the connecting bar and a transverse member 39 said tension spring being so arranged so that it moves through an over center position relative to lever 57 when the ramps are moved between their inclined positions and their horizontal positions so as to yieldably restrain movement of said ramps when the latter are moved to either position.

Operation of the ramps from their horizontal position to their inclined position is effected by the operation of an operating assembly 60. This operating assembly 60 includes a longitudinally elongated finger 61 which is mounted on the transverse shaft 62 the latter being rotatably mounted in suitable bearing block 63 secured to the supporting framework adjacent to said ramps and being spaced above the lower track assembly a distance a little greater than the diameter of the rolls so as to provide clearance for the latter. This finger 61 is located above and has a free end 61.1 slidably resting on one of the ramps. Operation of the transverse shaft 62 either by a hand lever 64, as shown, or any other suitable means which may be remotely situated, permits the finger to be pressed against the ramp over which it is located so as to move both ramps from their horizontal positions to their inclined positions.

The pair of ramps 24, shown only in side view FIG. 1 are pivotally mounted on a transverse pin 24.1 at the tail end of the upper track assembly. These ramps 24, in their normal position as shown in said FIG. 1, normally slope downwardly from the tail end of the upper track assembly and rest on the lower track assembly.

In operation of the conveyor 10 an automobile is positioned so that the front and rear tires on one side thereof are positioned on the platform over the slot 15 14 with ramps 52 positioned in their horizontal position so that the automobile engaging assemblies pass along the lower track assembly. When it is required to move the automobile through the work area the finger 61 is operated against the ramp over which it is situated moving both ramps 52-52 from their horizontal to their inclined positions. Rolls 31-31 of an automobile engaging assembly, approaching the elevator assembly pass beneath the shaft 62, swing the finger upwards and then pass upwards over the ramps 52-52 and onto the upper track assembly 19 so as to bring the roller 30 into engagement with the rear tire of the automobile and move the latter along the platform. It will be seen that as the automobile engaging assembly being lifted by the elevator assembly moves upwards over the ramps 52-52 when the rolls pass over the pins or bolts 53 thereof the trailing portions of the ramps act as levers, which, under the weight of the automobile engaging assembly automatically swing the ramps to their elevated position out of the path of any assemblies following. The ramps 52-52 of the elevator assembly remain in said horizontal position thus permitting assemblies 18 following to pass along the lower track assembly until the finger again is operated to move said ramps 52-52 and into the path of any selected assembly 18.

The ramps 24 permit each assembly 18 to drop smoothly from the upper to the lower track assembly and also swing upwards to permit the passage of any assembly carried by the lower track assembly.

It will be appreciated that, depending upon the space between successive automobile engaging assemblies one automobile after the other may be sent along the platform in closely spaced relationship regardless of the individual lengths of said automobiles.

It will also be evident that as the rollers 30 of said automobile engaging assemblies can only be lifted upwardly through the slot so that the segments above their axles 38 project above the upper surface of the platform, any object such as a workman's foot or the like will not be dragged downwardly through the platform but will be pushed upwardly therefrom. The present conveyor, therefore, provides safe working conditions for workers as well as providing a high density automobile flow.

Furthermore the finger 61 is located relative to the lower track assembly, so that the rolls of any assembly 18, which may reach a position immediately ahead of the elevator assembly, will prevent operation of the finger to move the ramps 52 towards their inclined position, thereby preventing jamming of the rolls against ramps 52 when the latter reach an intermediate position.

We claim:

1. An automobile conveyor including:
    a. a platform providing rolling support for a tire of an automobile for passage thereof through a work area, the platform having a slot bridged by the tire;
    b. an endless driven chain having an upper arm run spaced below the platform in alignment to the slot;
    c. a plurality of rollers mounted centrally of the chain at intervals along its length, the rollers being extendible through the slot;
    d. a pair of followers connected to the chain at each roller, the followers extending outwards of opposite sides of the chain, the chain, rollers and followers normally following a path in which the rollers pass in a normal hidden position beneath the platform;
    e. means movable into and out of the path of the followers for selectively lifting a pair of followers and a roller to an elevated position in which position the roller projects through the slot above the platform so as to engage an automobile tire; and
    f. a pair of upper tracks, having head and tail end arranged below the platform on opposite sides of the chain for receiving any pair of followers lifted by the chain for passing a roller, in an elevated position the length of the slot so as to move the automobile through the work area.

2. A conveyor as claimed in claim 1 wherein the followers are rolls, the rolls being coaxial of the rollers.

3. A conveyor as claimed in claim 2 wherein the chain is formed having links, each link having spaced apart side bars and an interconnecting pintle, each roller being mounted for rotation on a pintle between the side bars and the rolls being mounted on opposite ends of the pintle exteriorally of the chain.

4. A conveyor as claimed in claim 1 in which the means e. includes:
    g. a pair of ramps swingably mounted at the head end of the tracks for movement between inclined positions into the path of the rolls and substantially horizontal positions out of the path of the followers;
    h. overacting resilient means for yieldably resisting movement of the ramps out of either position; and
    i. means for moving ramps to either position against the action of the resilient means.

5. A conveyor as claimed in claim 1 wherein the tracks are disposed so that only an upper segment of a lifted roll projects above the platform.

6. A conveyor as claimed in claim 4 wherein the ramps are mounted intermediately of fore-and-aft ends for swinging movement about transverse axes so as for swing automatically to swing from inclined positions to horizontal positions under the weight of the followers as the latter pass over the transverse axes.

7. A conveyor as claimed in claim 1 including a pair of lower tracks spaced below the upper tracks upon which the followers ride when following the normal path.

8. A conveyor as claimed in claim 7 including ramps swingably mounted at the tail ends of the upper tracks for free swinging movement between inclined and substantially horizontal positions for guiding any pair of lifted followers from the upper tracks to the lower tracks and swinging upwards to permit passage of any followers following the lower tracks.